United States Patent
Yang

(10) Patent No.: US 7,035,659 B1
(45) Date of Patent: Apr. 25, 2006

(54) ESTIMATION OF FORWARD LINK SIGNAL-TO-NOISE RATIO

(75) Inventor: Hong Kui Yang, San Diego, CA (US)

(73) Assignee: VIA Telecom Co., Ltd., San Diego, CA (US)

( * ) Notice: Subject to any disclaimer, the term of this patent is extended or adjusted under 35 U.S.C. 154(b) by 692 days.

(21) Appl. No.: 10/007,383

(22) Filed: Oct. 22, 2001

(51) Int. Cl.
*H04B 7/005* (2006.01)

(52) U.S. Cl. ............ 455/522; 455/504; 455/226.3

(58) Field of Classification Search ............ 370/332; 455/522, 436, 434, 226.3, 504–506
See application file for complete search history.

(56) References Cited

U.S. PATENT DOCUMENTS

| | | | | |
|---|---|---|---|---|
| 5,933,781 A | * | 8/1999 | Willenegger et al. | 455/522 |
| 5,963,870 A | * | 10/1999 | Chheda et al. | 455/522 |
| 6,233,439 B1 | * | 5/2001 | Jalali | 455/127.2 |
| 6,587,696 B1 | * | 7/2003 | Ma et al. | 455/522 |
| 6,661,832 B1 | * | 12/2003 | Sindhushayana et al. | 375/144 |
| 6,687,510 B1 | * | 2/2004 | Esteves et al. | 455/522 |
| 2003/0082447 A1 | * | 5/2003 | Morioka et al. | 429/213 |
| 2003/0092447 A1 | * | 5/2003 | Bottomley et al. | 455/453 |

* cited by examiner

*Primary Examiner*—Curtis Kuntz
*Assistant Examiner*—Matthew C Sams
(74) *Attorney, Agent, or Firm*—Preston Gates & Ellis

(57) ABSTRACT

The present invention provides a technique for estimating signal-to-noise ratio of a forward traffic channel in a wireless communication system that utilizes a pilot channel. Initially, a signal-to-noise ratio is estimated for the pilot channel and an adjustment to convert the signal-to-noise ratio for the pilot channel to a signal-to-noise ratio for the forward traffic channel is estimated. The adjustment is then applied to the signal-to-noise ratio for the pilot channel to obtain an estimate for the signal-to-noise ratio for the forward traffic channel.

22 Claims, 3 Drawing Sheets

ESTIMATION OF FORWARD LINK SIGNAL-TO-NOISE RATIO

BACKGROUND OF THE INVENTION

1. Field of the Invention

The present invention concerns wireless communication systems, such as CDMA wireless telephone systems, and is particularly directed to the problem of estimating the signal-to-noise ratio on the forward traffic channel of a wireless communication system.

2. Description of the Related Art

In wireless communications technology, user data (e.g., speech) modulates a radio frequency signal for transmission and reception between a base station (BS) and a mobile station (MS) or mobile unit. The radio spectrum allocated by regulatory authorities for a wireless system is "trunked" to allow simultaneous use of a spectrum block by multiple units.

A common form of trunked access is frequency-division multiple access (FDMA). In FDMA, the spectrum is divided into frequency channels comprised of distinct portions of the spectrum. The limited frequency channels are allocated to users as needed. However, once a frequency channel is assigned to a user, that frequency channel is used exclusively by the user until the user no longer needs the channel. This limits the number of concurrent users of each frequency channel to one, and the total number of users of the entire system, at any instant, to the number of available frequency channels. However, in most cases a single user generally will not at all times use the full capacity of the channel assigned to him. Accordingly, obtaining maximum efficiency of the available resources is difficult to achieve by solely using FDMA.

Another common trunking system is time-division multiple access (TDMA). TDMA is commonly used in telephone networks, especially in cellular telephone systems, in combination with a FDMA structure. In TDMA, data (e.g., speech) are digitized and compressed to eliminate redundancy, thus decreasing the average number of bits required to be transmitted and received for the same amount of information. The time line of each of the frequency channels used by the TDMA system is divided into "frames" and each of the users sharing the common channel is assigned a time slot within each of the frames. Each user then transmits or receives a burst of data during its assigned time slot and does not transmit or receive during other times. With the exception of delays required by the bursty data transmission, which typically are small enough to be largely unnoticeable, the TDMA system will appear to the users sharing the frequency channel to have provided an entire channel to each user. The FDMA and TDMA combination technique is used by the GSM (global system for mobile communications) digital cellular system.

Yet another method for sharing a common channel between multiple users is code-division multiple access (CDMA) which uses direct sequence spread spectrum modulation. As with TDMA, the CDMA systems are typically used in conjunction with a FDMA structure, although this is not required. However, unlike the TDMA system, the CDMA system generally does not separate the multiple users of a common frequency channel using time slices. Rather, in CDMA, multiple users are separated from each other by superimposing a user-specific high-speed code on the data of each user. Because the applied code has the effect of spreading the bandwidth of each user's transmission, the CDMA system commonly is called a "spread spectrum" system.

Initially, the user information is digitized so that the information is represented as a sequence of "0" and "1" bits. For modulation purposes, it is common to convert this sequence of information bits into a corresponding synchronous time signal having +1 and −1 values, where +1 corresponds to a bit value of "0" and −1 corresponds to a bit value of "1".

"Direct sequence" spreading typically is accomplished by multiplying a narrowband information signal by a much wider band spreading signal. The error and redundancy encoded digital data (speech) for each of the shared users of the CDMA channel may, for example, be provided at a rate of 19.2 kilobits per second (kbps). These data are then spread using a much higher frequency spreading signal, which may, for example, be provided at a rate of 1.2288 megabits per second (Mbps). Using the wider frequency spreading signal, a CDMA frequency channel can accommodate many users on code sub-channels.

The spreading signal is usually a sequence of bits selected from one of 64 different orthogonal waveforms generated using Walsh functions. Specifically, each such Walsh function typically consists of a repeating 64-bit sequence. A different one of the 64 different Walsh functions is utilized for each sub-channel to be included in the frequency channel. At the receiving end, a particular sub-channel can be decoded using the same Walsh function which was used to encode the sub-channel. When decoded in this manner, the desired sub-channel signal is reproduced and the signals from the other 63 sub-channels are output as low level noise. As a result, a user can distinguish its code sub-channel from other users' sub-channels on the same frequency channel.

In addition to the above channel coding, the various sub-channels also are processed using other types of coding. For instance, data on the speech traffic sub-channels typically are encrypted using a repeating pseudo-random bit sequence (long code) which is unique to each different mobile unit and which has a period of $2^{42}-1$ bits. In order to coordinate encryption codes with the base unit, upon initial registration with the base unit the mobile unit provides its serial number to the base unit. The base unit then uses that serial number to retrieve the mobile unit's unique encryption code from the base station's database. Thereafter, the two can communicate using encrypted data, so as to provide a certain amount of privacy.

In addition to encryption coding, each sub-channel typically is encoded using an additional repeating pseudo-random bit sequence (PN code). The PN code sequence, also referred to as the chipping function, utilized by a particular base station may be expressed as c(t), because it is applied as a function of time t. The PN code sequence is generated using a linear feedback shift register (LFSR) which outputs a pseudo-random sequence of digital ones and zeros. These digital ones and zeros are converted to −1 and +1 symbols respectively and then filtered to give the chipping function c(t). Thus, the chipping function has the property that $c(t)^2=+1$. The period of the PN code sequence generated by a N-register LFSR is $2^N-1$ bits (or chips) long, although it is common to insert a zero to extend the full sequence length to $2^N$ chips. Typically, the PN code is generated using a 15-bit code word and a 15-register LFSR, providing a repeating sequence of $2^{15}=32,768$ chips.

Generally, the PN code is identical for all base stations in the cellular network. However, each base station typically applies the PN code using a different time delay from the other base stations. For example, each base station generally selects from one of 512 different offsets (spaced 64 chips apart) for use in its PN code. By utilizing different offsets in this manner, a mobile unit can selectively tune to any given base station merely by using the same offset as that base station. Accordingly, it can be seen that merely time shifting a PN code sequence in this manner produces the same result as if each base station were using an entirely different PN code.

In a typical system, each base station uses one of the sub-channels to broadcast a pilot signal. The pilot signal has no underlying information and usually consists of all binary zeroes (symbol =1). This pattern of all "1" symbols is modulated with the appropriate Walsh function so as to occupy sub-channel 0, and then is further coded using the base station's PN code, applied with the base station's designated delay. The main purpose of the pilot sub-channel is for use by the mobile units to synchronize themselves with the base station so the mobile units can effectively communicate with the base station.

When a mobile unit is powered on, it initially searches for a pilot signal, in an attempt to establish a lock with a base station. This process is called "acquisition". It is again noted that the only difference among the base stations in this regard is the time delay each base station applies to its PN code sequence. Thus, in order to "acquire", or lock on to, a base station, the mobile unit must align its locally generated version of the PN code sequence with the PN code sequence of the base station by determining the timing of the transmitted pilot's spreading sequence.

Therefore, at power up a mobile unit searches for a time delay which produces a sufficiently strong pilot signal to indicate to the mobile unit that it has acquired a base station. The acquisition process generally involves multiplying a received signal with different time-delayed versions of the PN code sequence and then identifying the version which resulted in the greatest signal strength, or identifying the first time-delayed version which results in a signal strength that exceeds a threshold level. The mobile unit then applies the identified time-delay to the PN code sequence used in its transmissions and receptions in all future communications with that base station. An acquisition process is described in co-pending U.S. patent application Ser. No. 08/956,057, titled "Method and Apparatus for Accelerated Acquisition of Base Stations by Buffering Samples", filed Oct. 22, 1997, which application is incorporated herein by reference as though set forth herein in full.

The acquisition process thus identifies the strongest base station, or at least a sufficiently strong base station, to monitor and with which to communicate. In a similar process, after acquisition has been completed the mobile unit periodically searches for the pilot signals of neighboring base stations that might have stronger signals than the base station with which the mobile unit currently is communicating. Once such a stronger base station is found, a handoff will occur in which the mobile unit will transition to communicating with the new base station. This might be necessary, for example, if the mobile unit is physically moved away from its current base station and toward the new base station. An example of a search process is described in co-pending U.S. patent application Ser. No. 09/255,032, titled "Accelerated Base Station Searching by Buffering Samples", filed Feb. 22, 1999, which application is incorporated herein by reference as though set forth herein in full.

In the course of signal processing by the mobile unit, it is often necessary or desirable to obtain an estimate of the signal-to-noise ratio of a traffic channel on the wireless link from the base station to the mobile unit (the "forward link"). For instance, fast forward link power control consists of an inner loop and an outer loop. In the inner loop, the mobile unit compares the estimated signal-to-noise ratio for a forward link traffic channel to a target signal-to-noise ratio and, based on that comparison, instructs the base station (via the reverse link) to increase or decrease its transmission power on the subject forward link traffic channel. In the outer loop, the target signal-to-noise ratio for the forward link traffic channel is set based on a desired frame error rate (FER) and evaluations of whether incoming frames are good or bad.

Estimation of the signal-to-noise ratio in this context has to be done quickly, e.g., within a single power control group (1.25 millisecond (ms) for IS-2000), and accurately. Similarly, fast and accurate estimation of the signal-to-noise ratio for a forward link traffic channel is desirable in other contexts in which determining quality of the incoming signal is important.

SUMMARY OF THE INVENTION

The present invention addresses this need by estimating the signal-to-noise ratio on a forward link traffic channel by estimating the signal-to-noise ratio on the pilot channel, calculating an adjustment, and then applying the adjustment to convert the estimated signal-to-noise ratio on the pilot channel to the desired signal-to-noise ratio on the forward link traffic channel.

Thus, in one aspect the invention is directed to estimating signal-to-noise ratio of a forward traffic channel in a wireless communication system that utilizes a pilot channel. Initially, a signal-to-noise ratio is estimated for the pilot channel and an adjustment to convert the signal-to-noise ratio for the pilot channel to a signal-to-noise ratio for the forward traffic channel is estimated. The adjustment is then applied to the signal-to-noise ratio for the pilot channel to obtain an estimate for the signal-to-noise ratio for the forward traffic channel.

The foregoing arrangement often can provide faster and/or more accurate estimates of the signal-to-noise ratio (SNR) of a forward traffic channel in a wireless communication system. Specifically, due in part to the strength of the pilot signal, the SNR of the pilot channel often is easier to calculate and more accurate than the SNR for a forward traffic channel.

The adjustment to convert the SNR for the pilot channel to a SNR for a forward traffic channel preferably is comprised of a fast correction component (e.g., updated at 1.25 ms intervals) and a slow correction component (e.g., updated at 20 ms intervals). As a result, adjustments with reasonable accuracy can be made relatively quickly while more accurate adjustments can be made at longer intervals.

In the preferred embodiment of the invention, the fast correction component is based on the power control instruction sent from the mobile station to the base station while the slow correction component is based on a ratio of estimated traffic channel power to estimated pilot channel power. As a result, the slow correction can be constructed to function as an error correction loop.

The foregoing summary is intended merely to provide a brief description of the general nature of the invention. A more complete understanding of the invention can be obtained by referring to the claims and the following detailed description of the preferred embodiments in connection with the accompanying figures.

DESCRIPTION OF THE PREFERRED EMBODIMENT(S)

Overview.

A common metric for evaluating the quality of a received signal in wireless communication systems is bit-energy-to-noise-density of the received signal ($E_b/N_t$), which is one measure of the signal-to-noise (S/N) ratio of the received signal. The present invention approaches estimation of $E_b/N_t$ for a traffic channel (i.e., one on which speech or other communicated information is transmitted) by first estimating a S/N ratio for the pilot channel and then converting this quantity into $E_b/N_t$. More specifically, the traffic channel $E_b/N_t$ can be estimated as:

$$\frac{E_b}{N_t} = \text{pilot}\_\frac{E_s}{N_t} + TPR, \text{dB} \qquad (\text{Eq. 1})$$

where pilot_$E_s$ is the pilot energy per symbol. The symbol rate defined here is constant (e.g., 19.2 kbps) and is independent of the traffic data rate. Therefore, pilot_$E_s$ is independent of the traffic data rate.

TPR is the traffic-energy-per-information-bit-to-pilot-energy-per-symbol rate ratio. It is also independent of the traffic data rate.

Thus, in order to obtain the traffic channel $E_b/N_t$, pilot_$E_s/N_t$ and TPR need to be estimated. Pilot_$E_s/N_t$ estimation is based on the pilot signal and is discussed below.

In the preferred embodiment of the invention, TPR estimation consists of two estimations: one is a fast TPR estimation and the other is a slow TPR estimation. Preferably, TPR is written as:

$$TPR = TPR\_fast + TPR\_slow \qquad (\text{Eq. 2})$$

Where, $$TPR\_fast = \sum_{k_1} G_{pc1}(k_1) \qquad (\text{Eq. 2a})$$

$$TPR\_slow = \sum_{k_2} G_{pc2}(k_2) \qquad (\text{Eq. 2b})$$

$G_{pc1}$ is the fast TPR correction estimation and it corrects the TPR to account for power control (PC) gain adjustment in the base station (BS). The fast TPR correction estimation $G_{pc1}$ preferably is updated per power control group (PCG) when using an 800 bit-per-second (bps) PC rate, per two PCGs when using a 400 bps PC rate, or per four PCGs when using a 200 bps PC rate, depending on the PC mode defined in IS-2000.

A slow TPR correction estimation $G_{pc2}$ is used to correct any error other than that due to the fast TPR estimation. This gain correction might, for example, be updated in intervals of multiple frames. These additional errors to be corrected might, for example, be an incorrect initial TPR setting, PC gain adjustment error due to PC bit error, etc.

Pilot_$E_s/N_t$ Estimation.

Figure 1:
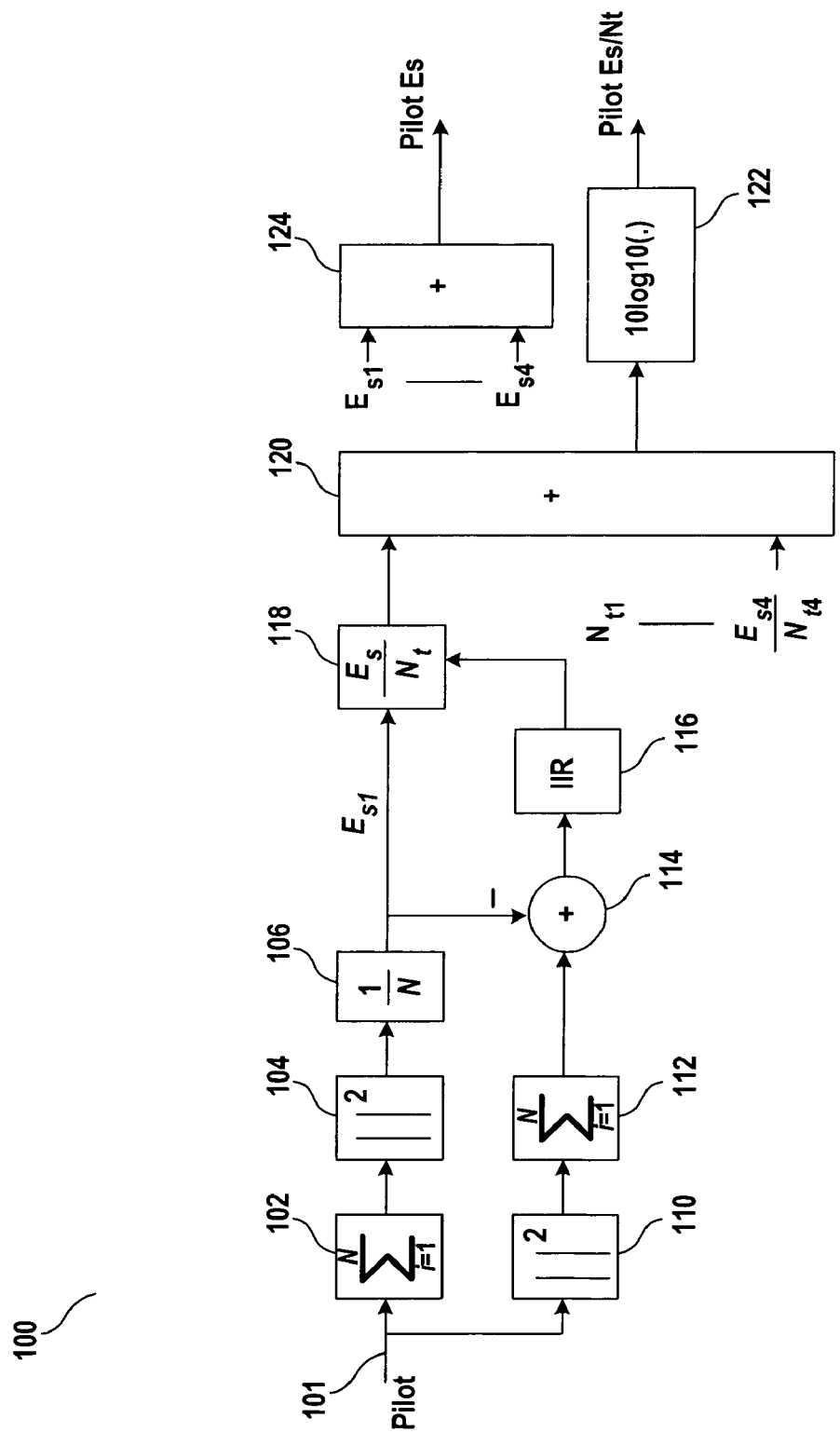
FIG. 1 is a block diagram illustrating a system for determining the signal-to-noise ratio for the pilot channel in a wireless communication system.

FIG. 1 illustrates a system 100 that can be used to estimate pilot_$E_s/N_t$. It is noted that FIG. 1 explicitly shows only the first finger of the Rake receiver, with all other fingers being identical in structure. The despread pilot signal 101 corresponding to the first finger of the Rake receiver is input at symbol rate.

In the upper branch of the finger, the total pilot symbol energy for the first finger is determined. First, N symbols are accumulated in accumulator 102, and then the resulting value is squared in squaring element 104 and divided by N in divider 106. The resulting signal $E_{s1}$ represents the total symbol energy of the pilot signal for the first finger, with the noise generally averaging out to a value near zero in accumulator 102.

The coherent integration length N preferably is a variable. For example, in IS-2000 it might be 24 (over one PC group, or 1.25 ms).

In the lower branch of the finger, the total signal energy is obtained by squaring each sample in squaring element 110 and then accumulating N such values in accumulator 112. The noise energy is then obtained by subtracting the filtered pilot signal energy estimate (i.e., $E_{s1}$, the output of divider 106) from this estimate of total signal energy (i.e., the output of accumulator 112) in subtractor 114.

An infinite impulse response (IIR) filter 116 is then used to further smooth the noise power. The IIR filter preferably takes the form of $$H_{iir}(z) = \frac{(1-a)}{1-az^{-1}} \qquad (\text{Eq. 3})$$

The time constant for this IIR filter is $$\tau = -\frac{T_{pcg}}{\ln(a)} \qquad (\text{Eq. 4})$$

where $T_{pcg}$ is the PCG period of the input signal which, in the present embodiment is 1.25 ms. For a=0.85, the time constant is about 7.7 ms. Preferably, the time constant is selected to strike a balance between accuracy (requiring a higher time constant) and accommodating signal fading (requiring a lower time constant). In the preferred embodiment of the invention, the time constant is set to approximately equal the fading duration. The output of IIR filter 116 is a measure of the total noise energy $N_{t1}$.

In divider 118, the total pilot signal energy for the current finger is divided by the total noise energy for the current finger. S/N ratios for all of the receiver fingers (preferably up to four) are then combined in adder 120 to provide an estimate of Pilot_$E_s/N_t$, which value is converted into decibels by dB conversion module 122.

Also as shown in FIG. 1, the pilot signal energy estimates for all of the fingers i, $E_{si}$ are combined in adder 124 to provide an estimate of the total pilot signal energy, Pilot_$E_s$. This value is used in the estimation of the slow TPR correction $G_{pc2}$, as discussed in more detail below.

Fast TPR Correction Estimation.

One simple way to obtain the fast TPR correction $G_{pc1}$ is to translate the PC command in the mobile unit to a PC gain change without considering the PC bit error rate (BER) experienced by the base station. In this case, the fast TPR correction can be written as follows:

$$G_{pc1}(k) = (1 - 2b_k) PCStep \qquad (Eq. 5)$$

where $b_k$ is the PC command and has a value of 1 or 0, with 1 indicating an instruction for the base station to decrease its transmission power and 0 indicating an instruction for the base station to increase its transmission power. PCStep is the power control step size (in dB) utilized by the base station.

If PCStep is not known unambiguously in the mobile station (e.g., by convention or by the BS communicating the value to the MS), it can be estimated. Such an estimate can be performed by trying the various possibilities (e.g., 0.25 dB, 0.5 dB and 1.0 dB) over a large number of frames to determine which produces the lowest error, or to find the first that yields an error less than a specified threshold.

If the fast TPR correction alone were utilized, an accumulated bias might occur over the long run due to a number of different factors, such as the existence of an actual PC BER (often approximately 4%) and the fact that the mobile unit is unaware of which specific PC bits are decoded to the incorrect value in the BS. As a result, the $G_{pc1}$ estimation in Eq. 5 above that is performed by the MS assumes that there are no such errors.

Also, the initial traffic-to-pilot ratio utilized by the mobile station and/or the PC step size, PCStep, used in the base station often are unknown to mobile unit. Either or both, therefore, might need to be estimated, leading to potential errors. The slow TPR correction is used to correct these errors.

Slow Traffic to Pilot Ratio Correction Estimation.

Figure 2:
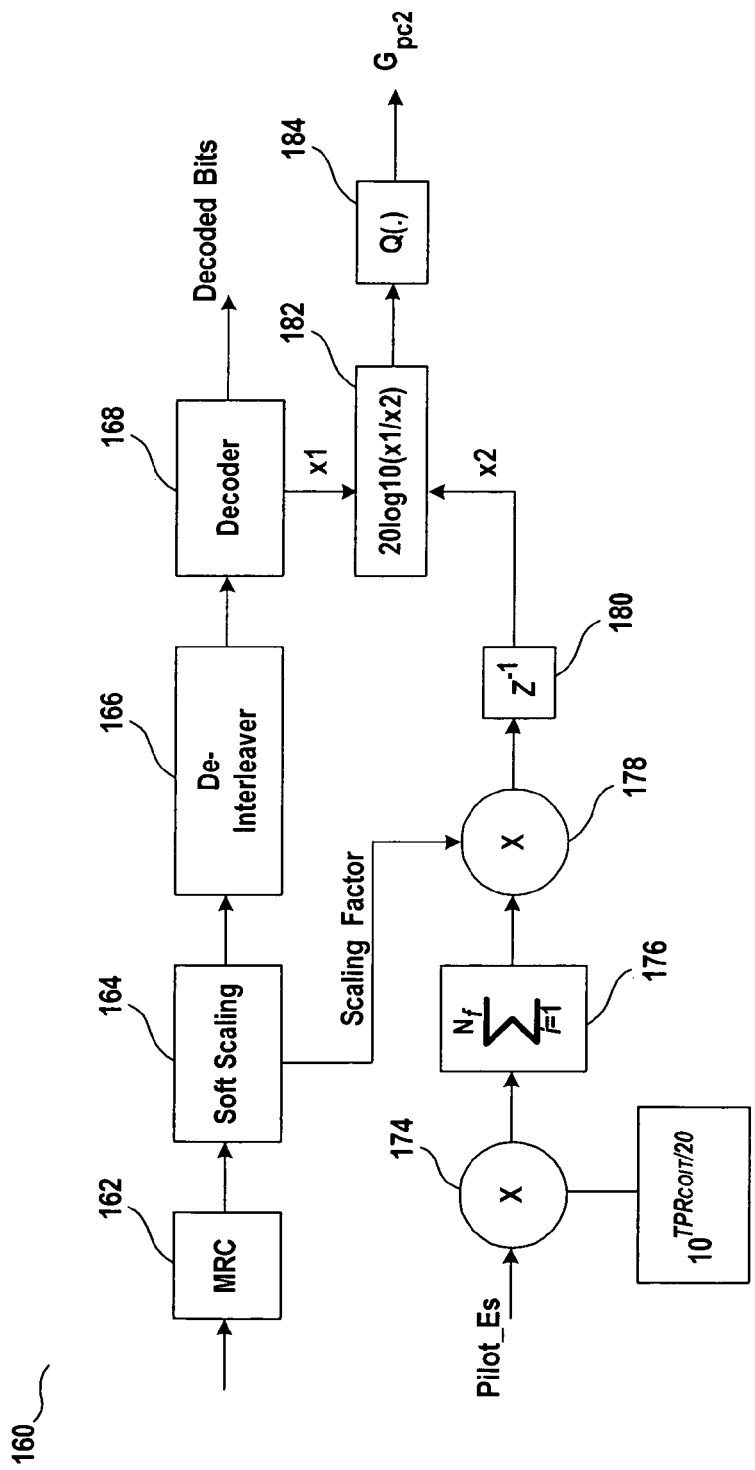
FIG. 2 is a block diagram illustrating a system for determining the slow TPR correction components according to a representative embodiment of the present invention.

FIG. 2 illustrates a block diagram of a system 160 for estimating the slow TPR correction $G_{pc2}$ according to a representative embodiment of the present invention. In FIG. 2, the multi-path components of the traffic signal are combined in maximal ratio combining (MRC) module 162 to produce power estimates for the traffic signal symbols. Then, soft scaling is performed in module 164 in order to limit the magnitude and dynamic range of the signal to levels that can be accommodated by a de-interleaver of not unreasonable complexity. Such de-interleaving is performed in de-interleaver 166, and the signal is decoded in decoder 168 (in the present embodiment, a Viterbi decoder). The actual received signal power for the frame, x1, is estimated in the Viterbi decoder 168 (the Viterbi metric) by accumulating the energy over the surviving path (the upper branch).

The time-synchronized traffic power based on pilot signal power x2 is estimated in the lower branch by inputting Pilot_$E_s$ (e.g., as output from adder 124 in FIG. 1), scaling based on the current TPRcorr (discussed below) in multiplier 174, accumulating over all fingers in accumulator 176, scaling (in multiplier 178) by the same scaling factor applied in the upper branch, and applying a delay in delay element 180 to match the delay introduced by de-interleaver 166.

In FIG. 2, TPRcorr is the corrected TPR after considering rate difference information (i.e., between the pilot channel and the traffic channel) and a calibration factor. In the present embodiment of the invention, TPRcorr is defined as:

$$TPRcorr = TPR - 10\log 10\left(\frac{SymbolRate}{DataRate}\right) - CalFactor \qquad (Eq. 6)$$

where CalFactor is a calibration factor between the an unbiased traffic signal power estimation and the measurement output from Viterbi decoder accumulated metrics in the survived path. This CalFactor often is necessary because: (1) there may be a scaling factor applied to the Viterbi metric; (2) there may be signal clipping in soft scaling module 164; and (3) there may be other additional residual errors. The CalFactors can be obtained by performing simulations and the appropriate values to use generally will depend upon the radio configuration and the data rate of the traffic channel.

Element 182 inputs x1 and x2 and outputs the ratio of x1/x2 in decibels. The output of element 182 typically changes very slow over frames and therefore approximates $G_{pc2}$. To make the adjustment discretely, a quantization block 184 is added, resulting in the following equation to calculate the slow TPR adjustment.

$$G_{pc2} \approx Q\left(20\log 10\left(\frac{x_1}{x_2}\right)\right) \qquad (Eq. 7)$$

where the function Q(.) implemented by quantization element 184 is defined as:

$$Q(x) = \begin{cases} +STEP\_CORR, & x \geq +THR\_CORR \\ -STEP\_CORR, & x \leq -THR\_CORR \\ 0, & Otherwise \end{cases} \qquad (Eq. 8)$$

where settable parameters STEP_CORR is the correction step size in dB and THR_CORR is the correction threshold. In the simulations, the defaults preferably are STEP_CORR=THR_CORR=1.0 dB. TPR is then calculated as shown in Eq. 2 above.

Sample Implementation.

Figure 3:
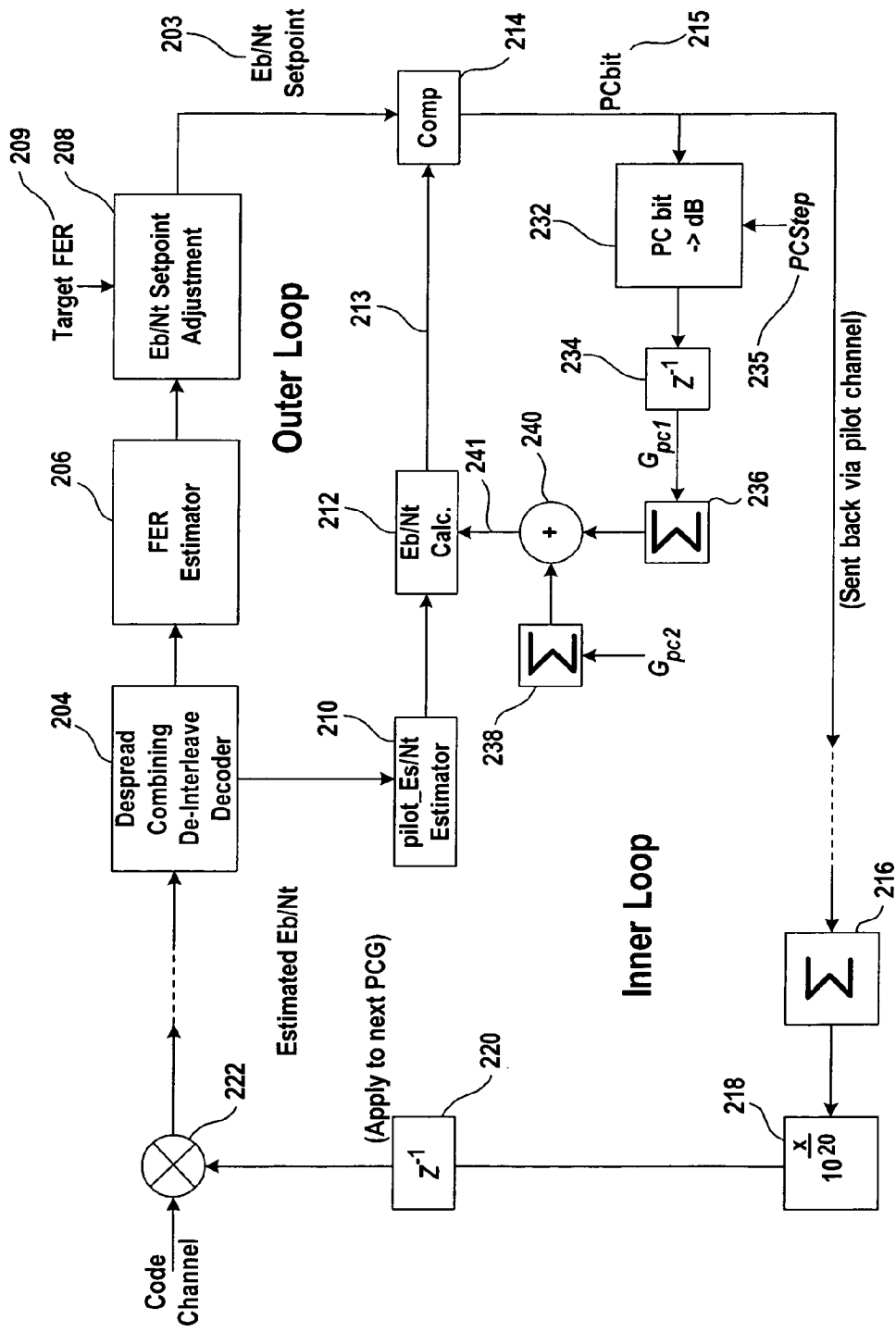
FIG. 3 is a block diagram illustrating a system for performing fast forward power control according to a representative embodiment of the present invention.

An implementation of fast forward power control based on the above-described technique is shown in FIG. 3. Fast forward power control according to a representative embodiment of the present invention includes an outer loop for setting an $E_b/N_t$ setpoint 203 and an inner loop for estimating the actual $E_b/N_t$ 213, comparing this value to the $E_b/N_t$ setpoint 203, and transmitting a command to the BS to increase or decrease the forward link traffic signal power based on the comparison. Thus, as shown in FIG. 3, in the preferred embodiment of the invention the inner loop includes processing in both the base station and in the mobile station, while the outer loop is executed entirely in the mobile station.

The determination of the $E_b/N_t$ setpoint 3 in the outer loop will now be described in more detail. Initially, the traffic channel signal received from the base station is processed using conventional decoding processing 204 (e.g., despreading, de-interleaving and decoding). Based on the embedded error detection/correction codes, the frame error rate is determined in FER estimator 206 (e.g., using conventional techniques). By comparing this estimate to an input target FER 209, the previous $E_b/N_t$ setpoint is adjusted in module 208 to provide the current $E_b/N_t$ setpoint 203.

As noted above, in the inner loop $E_b/N_t$ is estimated and compared to the $E_b/N_t$ setpoint 203 in order to generate a PC command 215. Preferably, the PC command 215 is a single bit (i.e., $b_k$ in Eq. 5) that instructs the base station to increase or decrease transmission power on the forward traffic channel.

More specifically, in module 210 the pilot $E_s/N_t$ is estimated (e.g., as discussed above in system 100). Using this estimate, $E_b/N_t$ 213 is estimated in module 212 (e.g., by adding TPR to it according to Eq. 1). The preferred hardware for estimating the TPR in this fast forward power control circuit is described below and follows Eq. 2 et seq.

Then, in module 214 the $E_b/N_t$ estimate 213 is compared against the $E_b/N_t$ setpoint 203 to generate PCbit 215. Preferably, PCbit 215 is set equal to 1 (interpreted as instructing the BS to decrease transmission power) if the estimated $E_b/N_t$ 213 is greater than the $E_b/N_t$ setpoint 203 and is set equal to 0 (interpreted as instructing the base station to increase transmission power) if the estimated $E_b/N_t$ 213 is less than the $E_b/N_t$ setpoint 203.

The PC command 215 is then transmitted back to the base station. At the base station, the PCbit command 215 is accumulated with prior PC commands in accumulator 216, the accumulated value (together with the initial value) is transformed into a power factor in module 218, and used by multiplier 222 to control the forward link power transmitted by the base station. In the present embodiment, module 218 is configured to interpret each PC command 215 as an instruction to increase or decrease the transmitted power by 0.5 dB. Delay element 220 indicates that the currently received PCbit command 215 is applied to the next PCG.

The circuitry for calculating $E_b/N_t$ for the present implementation is now discussed in more detail. In conversion module 232, the fast TPR correction $G_{pc1}$ is derived from PC command bit 215 generated by the mobile unit and PCStep 235 in accordance with Eq. 5. Then, delay module 234 is used to delay $G_{pc1}$ by one PCG. It is noted that one PCG delay is used to compensate for the assumed delay 220 introduced by the base station in applying the received PC command 215 to the next PCG. As noted above, PCStep 235 is an estimate of the PC step size used by the base station (here, assumed to be 0.5 dB).

The $G_{pc1}$ values are accumulated in accumulator 236 to provide the fast_TPR estimation. Similarly, the $G_{pc2}$ values (generated by system 160 illustrated in FIG. 2) are accumulated in accumulator 238 to provide the slow_TPR estimation. Then, adder 240 provides the TPR estimation 241 as the sum of the fast_TPR estimation and the slow_TPR estimation. This TPR estimation 241, together with the estimate of pilot_$E_s/N_t$ from module 210, is input into $E_b/N_t$ calculation block 212, which performs the calculation defined by equation Eq. 1 above.

Preferably, the initial values are set as follows: $G_{pc2}$=0 dB and PCStep=0.5 dB. The initial $E_b/N_t$ setpoint may be selected using any known conventional technique.

In the preferred embodiment of the invention, $E_s/N_t$ is estimated and updated at a rate depending on a parameter (FPC_MODE) set by the base station that indicates the number of channels to be used for the communication, the types of channels (voice, data), and, if two channels are being used, whether gain control is to be performed independently for each or whether the same gain control is to be applied to both. Preferably, PCStep will be estimated and $G_{pc2}$ will be corrected every couple of frames.

Alternate System Environment.

The embodiments described above generally utilize hardware to implement the indicated processing. However, it should be apparent to those skilled in the art that the same processing can be performed entirely by software or by any combination of hardware, software, firmware, etc., with the particular implementation being selected based on known engineering tradeoffs.

Thus, for example, many of the methods and techniques described herein also can be practiced with a general-purpose computer system. Such a computer typically will include, for example, at least some of the following components: one or more central processing units (CPUs), read-only memory (ROM), random access memory (RAM), input/output circuitry for interfacing with other devices and for connecting to one or more networks (which in turn may connect to the Internet or to any other networks), a display (such as a cathode ray tube or liquid crystal display), other output devices (such as a speaker or printer), one or more input devices (such as a mouse or other pointing device, keyboard, microphone or scanner), a mass storage unit (such as a hard disk drive), a real-time clock, a removable storage read/write device (such as for reading from and/or writing to a magnetic disk, a magnetic tape, an opto-magnetic disk, an optical disk, or the like), and a modem (which also may connect to the Internet or to any other computer network via a dial-up connection). In operation, the process steps to implement the above methods typically are initially stored in mass storage (e.g., the hard disk), are downloaded into RAM and then executed by the CPU out of RAM.

Suitable computers for use in implementing the present invention may be obtained from various vendors. Various types of computers, however, may be used depending upon the size and complexity of the tasks. Suitable computers include mainframe computers, multiprocessor computers, workstations, personal computers, and even smaller computers such as PDAs, wireless telephones or any other networked appliance or device. In addition, although a general-purpose computer system has been described above, a special-purpose computer may also be used.

It should be understood that the present invention also relates to machine-readable media on which are stored program instructions for performing the methods of this invention. Such media include, by way of example, magnetic disks, magnetic tape, optically readable media such as CD ROMs and DVD ROMs, semiconductor memory such as PCMCIA cards, etc. In each case, the medium may take the form of a portable item such as a small disk, diskette, cassette, etc., or it may take the form of a relatively larger or immobile item such as a hard disk drive, ROM or RAM provided in a computer.

Additional Considerations.

Thus, although the present invention has been described in detail with regard to the exemplary embodiments thereof and accompanying drawings, it should be apparent to those skilled in the art that various adaptations and modifications of the present invention may be accomplished without departing from the spirit and the scope of the invention. Accordingly, the invention is not limited to the precise embodiments shown in the drawings and described above. Rather, it is intended that all such variations not departing from the spirit of the invention be considered as within the scope thereof as limited solely by the claims appended hereto.

Also, several different embodiments of the present invention are described above, with each such embodiment described as including certain features. However, it is intended that the features described in connection with the discussion of any single embodiment are not limited to that embodiment but may be included and/or arranged in various combinations in any of the other embodiments as well, as will be understood by those skilled in the art.

What is claimed is:

1. A method for estimating signal-to-noise ratio of a forward traffic channel in a wireless communication system that utilizes a pilot channel, said method comprising:
    estimating a signal-to-noise ratio for the pilot channel;
    estimating an adjustment to convert the signal-to-noise ratio for the pilot channel to a signal-to-noise ratio for the forward traffic channel; and
    applying the adjustment to the signal-to-noise ratio for the pilot channel to obtain an estimate for the signal-to-noise ratio for the forward traffic channel,
    wherein the adjustment is formed together by a fast correction component and a slow correction component, such that the fast and slow correction components are utilized jointly, instead of separately, when the adjustment is applied.

2. A method according to claim 1, wherein the signal-to-noise ratio for the pilot channel is added to the adjustment to obtain the signal-to-noise ratio for the forward traffic channel.

3. A method according to claim 1, wherein the fast correction component is updated more frequently than the slow correction component.

4. A method according to claim 3, wherein the slow correction component is updated at intervals of at least one frame.

5. A method according to claim 3, wherein the fast correction component is updated at an interval of not more than four power control groups.

6. A method according to claim 3, wherein the fast correction component is based on a power control signal sent to a base station in the wireless communication system.

7. A method according to claim 3, wherein the slow correction component is based on an estimation of a ratio of traffic channel power to a second estimation of traffic channel power that is based on pilot channel power.

8. A method according to claim 3, wherein the slow correction component is applied only if an estimate for the slow correction component has a magnitude that exceeds a set threshold.

9. A method according to claim 3, further comprising a step of estimating a power control step size for a base station in the communication system using a result from an estimation of the slow correction component.

10. A method according to claim 1, wherein the signal-to-noise ratio for the pilot channel is estimated by summing signal-to-noise ratios for each finger in a Rake receiver.

11. A method according to claim 1, further comprising a step of utilizing the estimate for the signal-to-noise ratio for the forward traffic channel to perform forward channel power control.

12. An apparatus for estimating signal-to-noise ratio of a forward traffic channel in a wireless communication system that utilizes a pilot channel, said apparatus comprising:
    means for estimating a signal-to-noise ratio for the pilot channel;
    means for estimating an adjustment to convert the signal-to-noise ratio for the pilot channel to a signal-to-noise ratio for the forward traffic channel; and
    means for applying the adjustment to the signal-to-noise ratio for the pilot channel to obtain an estimate for the signal-to-noise ratio for the forward traffic channel,
    wherein the adjustment is formed together by a fast correction component and a slow correction component, such that the fast and slow correction components are utilized jointly, instead of separately, when the adjustment is applied.

13. An apparatus according to claim 12, wherein the signal-to-noise ratio for the pilot channel is added to the adjustment to obtain the signal-to-noise ratio for the forward traffic channel.

14. An apparatus according to claim 12, wherein the fast correction component is updated more frequently than the slow correction component.

15. An apparatus according to claim 14, wherein the slow correction component is updated at intervals of at least one frame.

16. An apparatus according to claim 14, wherein the fast correction component is updated at an interval of not more than four power control groups.

17. An apparatus according to claim 14, wherein the fast correction component is based on a power control signal sent to a base station in the wireless communication system.

18. An apparatus according to claim 14, wherein the slow correction component is based on an estimation of a ratio of traffic channel power to a second estimation of traffic channel power that is based on pilot channel power.

19. An apparatus according to claim 14, wherein the slow correction component is applied only if an estimate for the slow correction component has a magnitude that exceeds a set threshold.

20. An apparatus according to claim 14, further comprising a means for estimating a power control step size for a base station in the communication system using a result from an estimation of the slow correction component.

21. An apparatus according to claim 12, wherein the signal-to-noise ratio for the pilot channel is estimated by summing signal-to-noise ratios for each finger in a Rake receiver.

22. An apparatus according to claim 12, further comprising means for utilizing the estimate for the signal-to-noise ratio for the forward traffic channel to perform forward channel power control.

* * * * *